United States Patent Office 3,796,802
Patented Mar. 12, 1974

3,796,802
MITICIDAL METHOD CONTAINING ACTIVE FLUORO PHTHALIMIDE DERIVATIVES
Don R. Baker, Orinda, Calif., and Peter F. Epstein, Prairie Village, Kans., assignors to Stauffer Chemical Company, New York, N.Y.
No Drawing. Original application Mar. 10, 1971, Ser. No. 122,987. Divided and this application Dec. 29, 1971, Ser. No. 217,695
Int. Cl. A01n 9/22
U.S. Cl. 424—274
2 Claims

ABSTRACT OF THE DISCLOSURE

A method of controlling mites with compounds of the formulas:

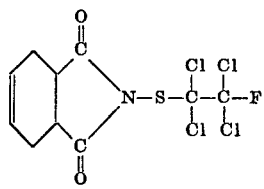

and

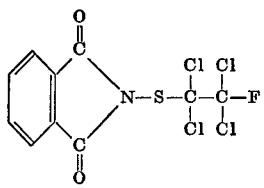

DESCRIPTION OF THE INVENTION

This is a division of application Ser. No. 122,987, filed Mar. 10, 1971.

This invention is directed to novel compounds which may be generally described as fluoro phthalimide derivatives which are active miticides. The compounds of the present invention are as follows:

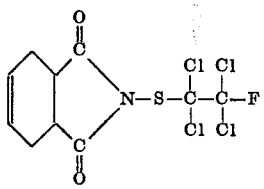

and

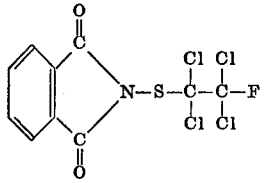

In general, the above two compounds can be prepared by reacting an appropriate phthalimide compound with an appropriate fluoro sulfenyl chloride to produce the end product.

In order to illustrate the merits of the present invention the following examples are provided:

EXAMPLE 1

N-(2-fluoro-1,1,2,2-tetrachloroethylthio)-tetrahydro phthalimide

A first material was prepared by mixing together 100 ml. water and 12.6 g. (0.05 mole) of 1,1,2,2-tetrachloro-2-fluoroethylsulfenyl chloride. Then, a second solution containing 7.5 g. (0.05 mole) of tetrahydro phthalimide and 2.0 g. (0.05 mole) sodium hydroxide and 100 ml. of water were mixed together. The second solution was then added to the first over a period of five minutes at 10–15° C. with stirring and cooling. A solid formed and the mixture was stirred for 30 minutes, when 100 ml. of chloroform was added. The chloroform solution was dried over magnesium sulfate and evaporated in vacuum to yield 9 g. of a yellow oil. On standing, crystals formed. Then, 10 ml. of n-pentane was added and the crystals filtered off and washed with additional n-pentane to yield 3.0 g. of crystals having a M.P. of 110–115° C.

EXAMPLE 2

N-(2-fluoro-1,1,2,2-tetrachloroethylthio)-phthalimide

To a suspension of 18.5 g. (0.1 mole) potassium phthalimide in 200 ml. of benzene was added a solution of 25.3 g. (0.1 mole) of 2-fluoro-1,1,2,2-tetrachloroethylene-1-sulfenyl chloride in 50 ml. of benzene. The reaction was exothermic and the temperature was maintained below 30° C. After the addition of the components, the mixture was warmed to 70° C. and allowed to stand overnight. The benzene was removed under reduced pressure and the residue dissolved in mixed chloroform and water. The chloroform layer was evaporated, washed twice with a cold sodium hydroxide solution and twice with water, dried over sodium sulfate, filtered and stripped. A white solid was formed, having a M.P. of 147–149° C. The yield was 26.9 g.

Entomological testing methods

The compounds of the present invention were tested to show activity against two-spotted mites as follows: Pinto beans ( *Phaseolus* sp.) plants, approximately 2–3 inches tall, were transplanted into sandy loam soil in 3″ clay pots and infested with 50–75 aphids of mixed ages. Twenty-four hours later they were sprayed, to the point of run-off, with aqueous suspension of the toxicant. Aliquots of the toxicant, dissolved in appropriate solvent, are diluted in water to which has been added 0.0002% of a conventional wetting agent such as a polyoxy-ethylene sorbitan monolaurate ether of alkylated phenolic phenols blended with organic sulfonates. Test concentrations ranged from 0.05% to that at which 50% mortality is obtained. Mortality is recorded after forty-eight hours and the $LD_{50}$ values are expressed as percent active ingredients in the aqueous suspensions. The results of these tests are tabulated below.

TABLE I.—$LD_{50}$ VALUES TWO-SPOTTED MITES

| Compound number | Structure | Percent P.E. | Eggs |
|---|---|---|---|
| 1 [1] | ![struct] | >0.05 | >0.05 |
| 2 | ![struct] | <0.01 | 0.01 |

(Example 1).

TABLE I—Continued

| Compound number | Structure | Percent P.E. | Eggs |
|---|---|---|---|
| 3[1] | 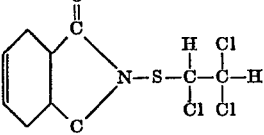 | >0.05 | >0.05 |
| 4 | 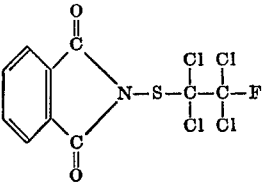 (Example 2). | 0.005 | 0.05 |

[1] See U.S. Pat. No. 3,178,447.

As can be seen from the above comparative data, Compounds No. 2 and 4 exhibit substantially higher activity than those obtained in the prior art Compounds No. 1 and 3.

What is claimed is:

1. The method of controlling mites comprising applying to a mite infested habitat a miticidally effective amount of the compound of the structure

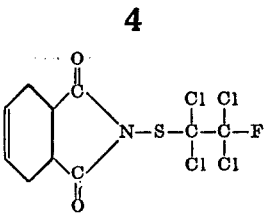

2. The method of controlling mites comprising applying to a mite infested habitat a miticidally effective amount of the compound of the structure

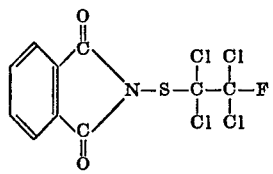

References Cited

UNITED STATES PATENTS

| 3,036,088 | 5/1962 | Harris, Jr. | 424—274 X |
| 3,178,447 | 4/1965 | Kohn | 424—267 X |

FOREIGN PATENTS

| 967,232 | 3/1950 | France | 424—274 |

ALBERT T. MEYERS, Primary Examiner

D. R. ORE, Assistant Examiner